United States Patent
Kurz

(10) Patent No.: US 10,655,566 B2
(45) Date of Patent: May 19, 2020

(54) GAS VALVE

(71) Applicant: Robert Bosch GmbH, Stuttgart (DE)

(72) Inventor: Michael Kurz, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 15/568,084

(22) PCT Filed: Mar. 21, 2016

(86) PCT No.: PCT/EP2016/056121
§ 371 (c)(1),
(2) Date: Oct. 20, 2017

(87) PCT Pub. No.: WO2016/169708
PCT Pub. Date: Oct. 27, 2016

(65) Prior Publication Data
US 2018/0142647 A1    May 24, 2018

(30) Foreign Application Priority Data
Apr. 21, 2015    (DE) .................. 10 2015 207 239

(51) Int. Cl.
*F02M 21/02* (2006.01)
*F16K 31/06* (2006.01)

(52) U.S. Cl.
CPC .... *F02M 21/0254* (2013.01); *F02M 21/0272* (2013.01); *F02M 21/0278* (2013.01);
(Continued)

(58) Field of Classification Search
CPC ............ F16K 31/0655; F16K 31/0627; F16K 31/0665; F16K 47/14; F16K 31/0696;
(Continued)

(56) References Cited

U.S. PATENT DOCUMENTS 4,725,002 A * 2/1988 Trachte .............. F02M 51/0603
239/102.2
5,752,489 A    5/1998 Henderson et al.
(Continued)

FOREIGN PATENT DOCUMENTS

DE    19822906    1/1999
EP    1114929    7/2001
WO    9117379    11/1991

OTHER PUBLICATIONS

International Search Report for Application No. PCT/EP2016/056121 dated Jun. 28, 2016 (English Translation, 2 pages).

*Primary Examiner* — Craig J Price
*Assistant Examiner* — Andrew J Rost
(74) *Attorney, Agent, or Firm* — Michael Best & Friedrich LLP

(57) ABSTRACT

The invention relates to a gas valve for metering a gaseous fuel into an intake tract of an internal combustion engine, comprising an electromagnet (1) for acting on an armature (2), which can be moved in a reciprocating manner and which is loaded in the direction of at least one valve seat (3) by the spring force of a spring (4). According to the invention, a damping device (5) is provided for reducing the speed of the armature (2) at least over a partial range of the stroke of the armature, which damping device comprises at least one fluid-filled variable damper volume (5.1, 5.2), which is separated in a gas-tight manner from a region (30) into which the gas to be metered in is admitted.

12 Claims, 6 Drawing Sheets

(52) U.S. Cl.
CPC ... *F16K 31/0696* (2013.01); *F02M 2200/304* (2013.01); *Y02T 10/32* (2013.01)

(58) Field of Classification Search
CPC ......... F02M 2200/306; F02M 21/0254; F02M 21/0278; F02M 21/0272; F02M 2200/304; F02M 45/086; F02M 45/083
USPC ....... 239/533.3–533.5, 585.1–585.5; 251/54, 251/48
See application file for complete search history.

(56) References Cited

U.S. PATENT DOCUMENTS

| | | | |
|---|---|---|---|
| 5,829,413 A * | 11/1998 | Rodriguez-Amaya | ...................... F02M 41/06 123/506 |
| 6,112,765 A * | 9/2000 | Boyer | ................... F02D 41/221 137/554 |
| 6,169,342 B1 | 1/2001 | Schmillen et al. | |
| 6,991,187 B2 * | 1/2006 | Czimmek | .......... F02M 51/0603 239/533.3 |
| 7,048,209 B2 * | 5/2006 | Czimmek | .......... F02M 51/0603 123/447 |
| 7,267,111 B2 * | 9/2007 | Liskow | ................ F02M 51/005 123/498 |
| 7,591,281 B2 * | 9/2009 | Tsuge | ................... F16K 31/0655 137/495 |
| 7,669,832 B2 * | 3/2010 | Petersen | ............ F16K 31/0689 251/12 |
| 8,534,639 B1 * | 9/2013 | Van Weelden | ...... F16K 31/0613 251/12 |
| 2013/0277585 A1 * | 10/2013 | Van Weelden | ...... F16K 31/0613 251/129.15 |

\* cited by examiner

GAS VALVE

BACKGROUND OF THE INVENTION

The invention relates to a gas valve for dosing a gaseous fuel into an intake tract of an internal combustion engine. Such a gas valve can be used in the field of automotive technology for the supply of fuel to gas or gas-diesel engines in passenger motor vehicles or utility vehicles, in rail vehicles and/or on ships. Also, further applications, for example in installations for energy recovery and/or energy production, are possible.

Laid-open specification DE 198 22 906 A1 discloses an electromagnetic actuator for actuating an actuating element, having at least one electromagnet which has a yoke provided with a coil and at least one pole face and which has an armature connected to the actuating element. The armature is guided movably, counter to the force of a restoring spring, in the direction toward the pole face of the electromagnet and is able to be placed in abutment with said face. In order to prevent the armature striking the pole face at high speed and bouncing thereoff again, which can lead to decreasing operational reliability and/or to disruptive noise development, it is proposed that the armature and/or the yoke are/is formed so as to be elastically deformable at least in partial regions in the direction of movement of the armature. The deformation is intended to dampen the movement of the armature such that the risk of bouncing and/or disruptive noises is reduced.

SUMMARY OF THE INVENTION

Starting out from the abovementioned prior art, the present invention is based on the object of specifying a gas valve for dosing a gaseous fuel into the intake tract of an internal combustion engine, which valve has a reduced tendency toward armature bouncing and also exhibits high dosing accuracy even in the case of small gas quantities. Furthermore, the wear in that region of a valve seat and/or of a closure element which interacts in a sealing manner with the valve seat should be reduced.

The gas valve which is proposed for dosing a gaseous fuel into an intake tract of an internal combustion engine comprises an electromagnet for acting on a reciprocating armature which is loaded in the direction of at least one valve seat by the spring force of a spring. According to the invention, a damping device which comprises at least one fluid-filled, variable damping volume, which is separated in a gas-tight manner from a region which is charged with the gas to be dosed in, is provided for reducing the speed of the armature at least over a partial range of its stroke The at least one fluid-filled, variable damping volume of the damping device causes the movement of the armature to be braked during the opening and/or during the closing of the gas valve. This means that the armature reaches its upper and/or lower stroke stop at reduced speed. The reduction in armature speed during the opening and/or closing of the gas valve in turn results in closure bounces being reduced and/or the wear in the region of the sealing seat being reduced. If, moreover, the armature speed is reduced during the ballistic armature stroke phase, it is possible for small gas quantities to be dosed in with higher accuracy.

The at least one fluid-filled, variable damping volume which is proposed for damping changes its size and/or shape preferably in dependence on the stroke of the armature. This means that the size and/or shape of the damping volume depends on the axial position of the armature. In order to reliably separate the fluid, with which the damping volume is filled, from the gas to be dosed in, it is proposed that the fluid is already introduced into the at least one damping volume during the assembly of the gas valve.

According to a preferred embodiment of the invention, the damping device comprises a first and a second fluid-filled, variable damping volume, which are connected via a throttle. The throttle makes it possible for fluid to be able to flow out of the one damping volume into the other damping volume, and vice versa. The damping effect can accordingly be set via the design of the throttle, that is to say the throttle cross section.

The throttle is preferably formed in a throttle plate which is arranged between the first and the second damping volume. The throttle plate allows a force-fitting, form-fitting and/or materially cohesive connection of the damping device to the armature, with the result that the axial position of the throttle plate depends on the stroke of the armature.

Preferably, the throttle plate is connected fixedly to the armature, for example via a press-fit, soldered, welded or bonded connection. The secure connection ensures that the armature carries the throttle plate, specifically regardless of whether the gas valve opens or closes. It is alternatively proposed that the throttle plate is prestressed axially against the armature by means of the spring force of a spring. For this purpose, the spring, which is already available and whose spring force loads the armature in the direction of a valve seat, may be used. An additional spring is therefore not required. A shoulder for supporting the throttle plate is preferably provided in the armature.

Also preferably, at least one damping volume is delimited by a body which is elastic and/or deformable. The body serves for the gas-tight separation of the damping volume from a region which is charged with the gas to be dosed in. The elasticity and/or deformability of the body ensures that the damping volume is variable with regard to size and/or shape.

The elastic and/or deformable body may be formed for example as a hollow cylindrical bellows. This should be arranged in the gas valve in such a way that the folds open or close in the direction of movement of the armature. The damping volume then varies primarily in the axial direction, while its cross-sectional area remains substantially the same.

In the case of a first and a second damping volume with in each case a fixed cross-sectional area, the damping effect can be set via the cross-sectional area ratio $A_1/A_2$ of the two volumes. If it holds that $A_1=A_2$, the total length of the damping device in the axial direction does not vary, regardless of the axial position of the throttle plate.

In order to separate the damping volume, delimited by an elastic and/or deformable body, in a gas-tight manner from the region charged with the gas to be dosed in, it is proposed that the body is closed at one end side. This means that the body has a wall at one end side. This has the advantage that, in the case of a throttle plate being present, the body has to be connected in a gas-tight manner only thereto.

In one refinement of the invention it is proposed that at least one body has an end-side stop surface which interacts, so as to form a stroke stop for the body, with the electromagnet and/or with a guide pin for guiding the armature. The stop surface may be formed for example via a wall which closes the body at one end side. The axial spacing of the stop surface to the electromagnet or to the guide pin defines an idle stroke of the damping device, during which the armature movement remains undamped. The onset of the damping effect occurs only when the damping device strikes against the electromagnet or the guide pin. The damping effect can accordingly be influenced in a targeted manner via the axial spacing.

Alternatively or additionally, it is proposed that at least one body is loaded by the spring force of an additional damping spring. The latter may be arranged inside or outside the body in dependence on the specific function of the damping spring. For example, the additional damping spring may be used for returning the damping device. Furthermore, axial prestressing of the damping device against an abutment surface may be brought about via an additional damping spring. The abutment surface may be in particular an end face of a guide pin for guiding the armature. The damping effect can be influenced in a targeted manner via the use of additional damping springs.

In order to create a gas valve which is of compact construction in particular in the axial direction, it is proposed that the damping device is accommodated at least partially in a recess of the armature. The recess is preferably formed centrally in an end face, facing the electromagnet, of the armature. The central arrangement prevents non-uniform loading of the armature due to the damping device.

Furthermore, the damping device may also be accommodated at least partially in a recess of the electromagnet. The recess is then preferably formed centrally in an end face, facing the armature, of the electromagnet. Since the electromagnet and the armature are generally arranged in a coaxial manner, the central arrangement in relation to the end face of the electromagnet leads to the damping device in turn being centrally arranged in relation to the armature.

According to a preferred embodiment of the invention, the armature has at least one plate-like section for forming an armature plate and/or for forming or for holding a valve closure element. This means that the armature is preferably designed as a flat armature. This allows the structural height of the gas valve to be reduced. If the armature has a plate-like section for forming or holding a valve closure element, a separate valve closure element may be omitted. Moreover, it is possible, via the plate-like section, for multiple, for example concentrically arranged, valve seats to be opened or closed at the same time. Preferably, at least one sealing body composed of an elastic material forms the valve closure element in order to ensure gas-tight closure of the gas valve. The plate-like section of the armature then serves for holding the sealing body(ies).

Preferably, at least one valve seat is of annular form. The annular valve seat is delimited by two concentrically arranged, annular sealing contours which are preferably formed by a plate-like valve seat element. This means that the gas valve comprises a plate-like valve seat element in which at least one annular valve seat is formed. In this way, it is possible for even large gas quantities to be dosed in via the gas valve.

BRIEF DESCRIPTION OF THE DRAWINGS

Preferred embodiments of the invention will be described in more detail below on the basis of the appended drawings, in which.

DETAILED DESCRIPTION

Figure 1:
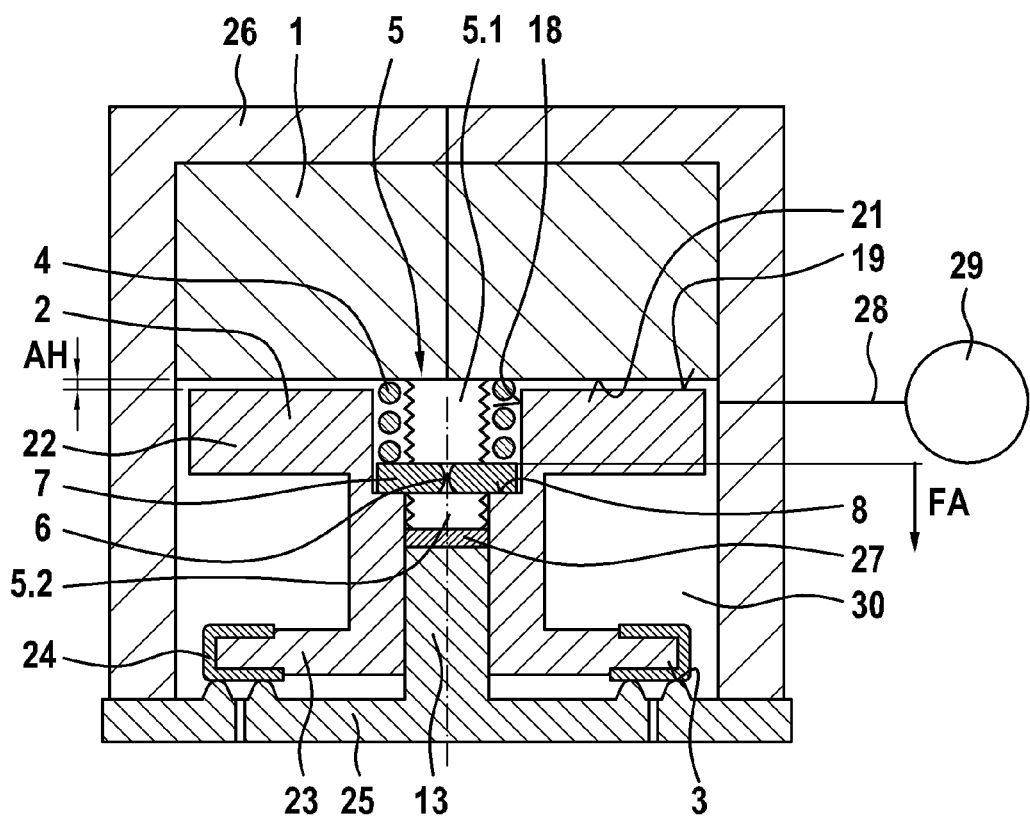
FIG. 1 shows a schematic longitudinal section through a gas valve according to the invention according to a first preferred embodiment in a closed state.
Figure 2:
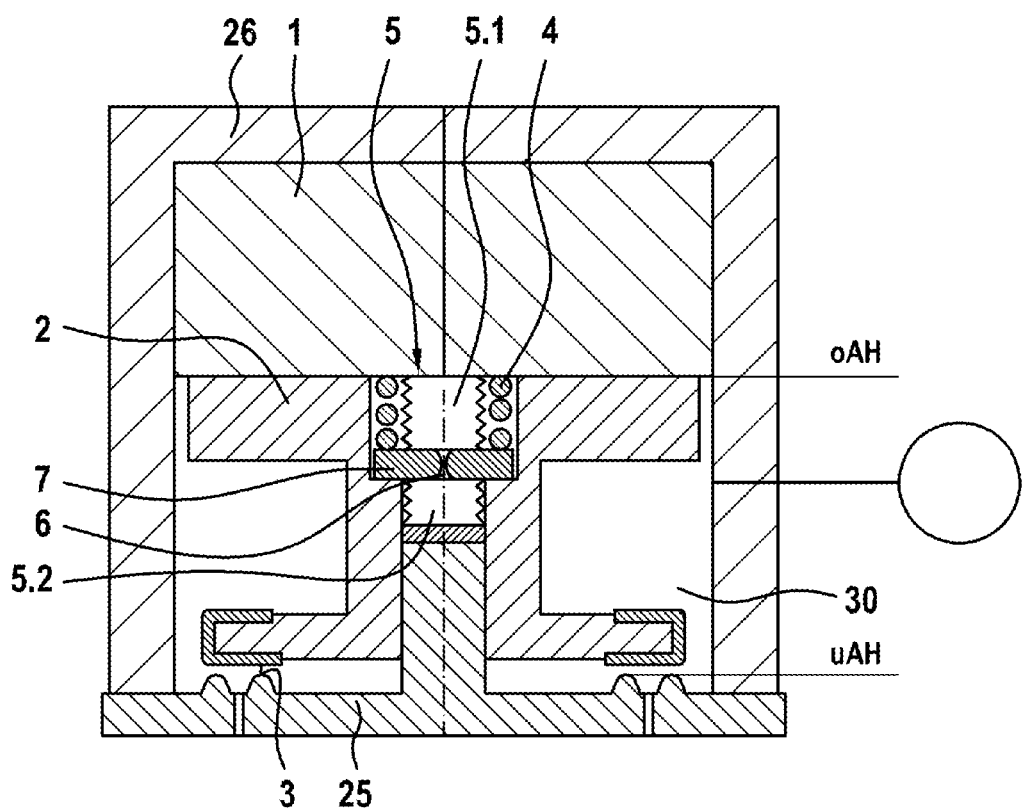
FIG. 2 shows the gas valve in FIG. 1 in an open state.

The gas valve illustrated in FIGS. 1 and 2 comprises a housing 26 in which an electromagnet 1 and a reciprocating armature 2 which interacts with the electromagnet 1 are accommodated. The armature 2 has for this purpose a first plate-like section 22, which has an end face 19 facing the electromagnet 1 and serving as a pole face. Formed in the end face 19 is a central recess 18 for accommodating a spring 4 whose spring force loads the armature 2 in the direction of an annular valve seat 3 which is formed in a plate-like valve seat element 25. For the gas-tight closure of the valve seat 3, the armature 2 has a second plate-like section 23 on which an elastic sealing body serving as a valve closure element 24 is arranged. For guiding the armature 2, there is provided a centrally arranged guide pin 13 which is formed by the valve seat element 25. In order to accommodate the guide pin 13, the central recess 18 is routed over the entire height of the armature 2.

The recess 18 also serves for accommodating a damping device 5 which comprises a first and a second fluid-filled, variable damping volume 5.1, 5.2. The first and second damping volume 5.1, 5.2 are connected via a throttle 6, which is formed in a throttle plate 7. The throttle plate 7 is axially prestressed against a shoulder 8 of the armature 2 via the spring force of the spring 4 likewise accommodated in the recess 18. Thus, the throttle plate 7 rises and falls together with the armature 2, or the armature 2 carries the throttle plate 7.

Each damping volume 5.1, 5.2 is enclosed by a body 9, 10 which is formed as a bellows and is connected to the throttle plate 7 in a gas-tight manner by welding. Since the bodies 9, 10 abut the electromagnet 1 and the guide pin 13, respectively, at the other end from one another, the stroke of the armature 2 leads to the bellows expanding or contracting. Correspondingly, the damping volume 5.1, 5.2 formed in the respective bellows increases or decreases, and the pressure prevailing there drops or rises, since the fluid is only able to to flow out or flow in in a throttled manner.

If the electromagnet 1 is energized, the armature 2 moves upward counter to the spring force $F_A$ of the spring 4 and opens up the valve seat 3. The armature stroke AH brings about a contraction of the upper damping volume 5.1 since the body 9 delimiting the volume is pressed together because of the support against the electromagnet 1. In this case, fluid flows from the upper damping volume 5.1 into the lower damping volume 5.2 via the throttle 6. The upward movement of the armature 2 is therefore braked in dependence on the cross-sectional area $A_1$ and on the design of the throttle 6 (see FIG. 3). This allows firstly the controlled dosing-in of small gas quantities during the ballistic armature stroke operation. Secondly, armature bouncing against the upper stroke stop oAH of the armature 2 is avoided. The gas to be dosed in is taken from a gas store 29 via a gas supply line 28. That region charged with the gas to be dosed in is denoted by the reference sign 30.

In order to close the gas valve, the energization of the electromagnet is ended, and the spring force $F_A$ of the spring 4 causes the armature 2 to return against the valve seat 3 which at the same time forms the lower stroke stop uAH of the armature 2. Since the damping device 5 is supported via the body 10 on the guide pin 13, or on a setting disk 27 lying therebetween, it is then the case that the lower damping volume 5.2 decreases and fluid flows via the throttle 6 back into the upper damping volume 5.1 during the downward movement of the armature 2. The damping brought about in this case depends on the design of the throttle 6 and on the cross-sectional area $A_2$ (see FIG. 3).

Since the downward movement of the armature 2 is also braked via the damping device 5, the wear of the gas valve in the region of the valve seat 3 or in that region of the valve closure element 24 which interacts with the valve seat 3 is reduced. In particular if—as is presently the case—the valve closure element 24 is formed by a sealing body composed of a relatively "soft" material, it is possible for the lifetime of the gas valve to be significantly lengthened in this way.

Figure 3:
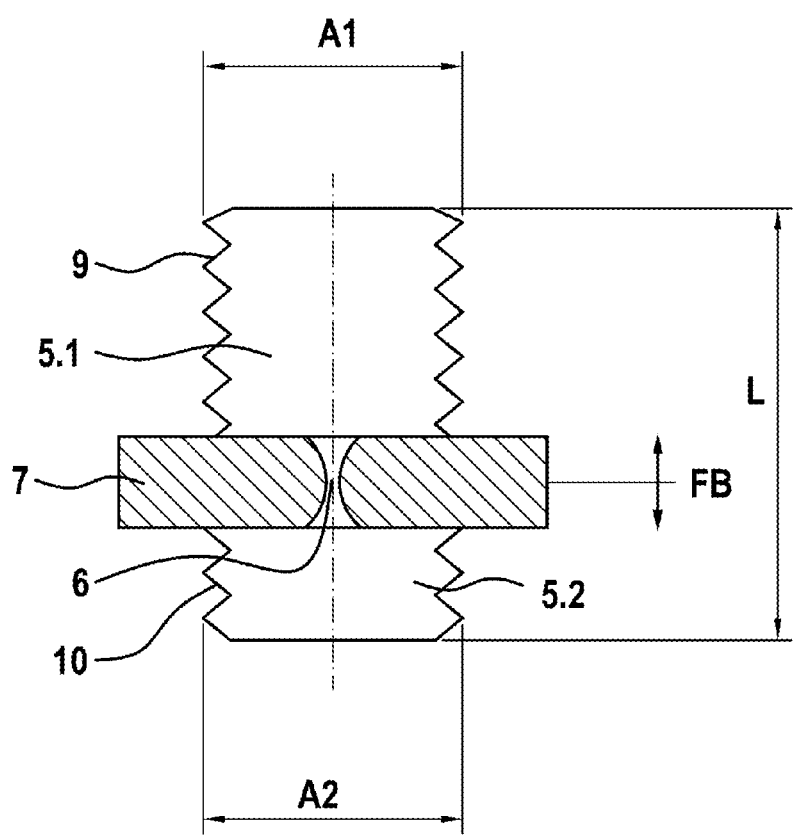
FIG. 3 shows a schematic illustration of the damping device of the gas valve in FIGS. 1 and 2.

A schematic illustration of the damping device 5 of the embodiment in FIGS. 1 and 2 can be seen in FIG. 3. Here, the cross-sectional areas $A_1$ and $A_2$ are each selected to be the same. This leads—regardless of the axial position of the throttle plate 7—to the length L of the damping device 5 always being the same, if the spring rate FB of the bodies 9, 10 is the same. This is because, when designed as a bellows, axial prestressing of the bodies 9, 10 against the electromagnet 1 or against the setting disk 27 can be brought about solely via the spring rate FB of the bellows.

Figure 4:
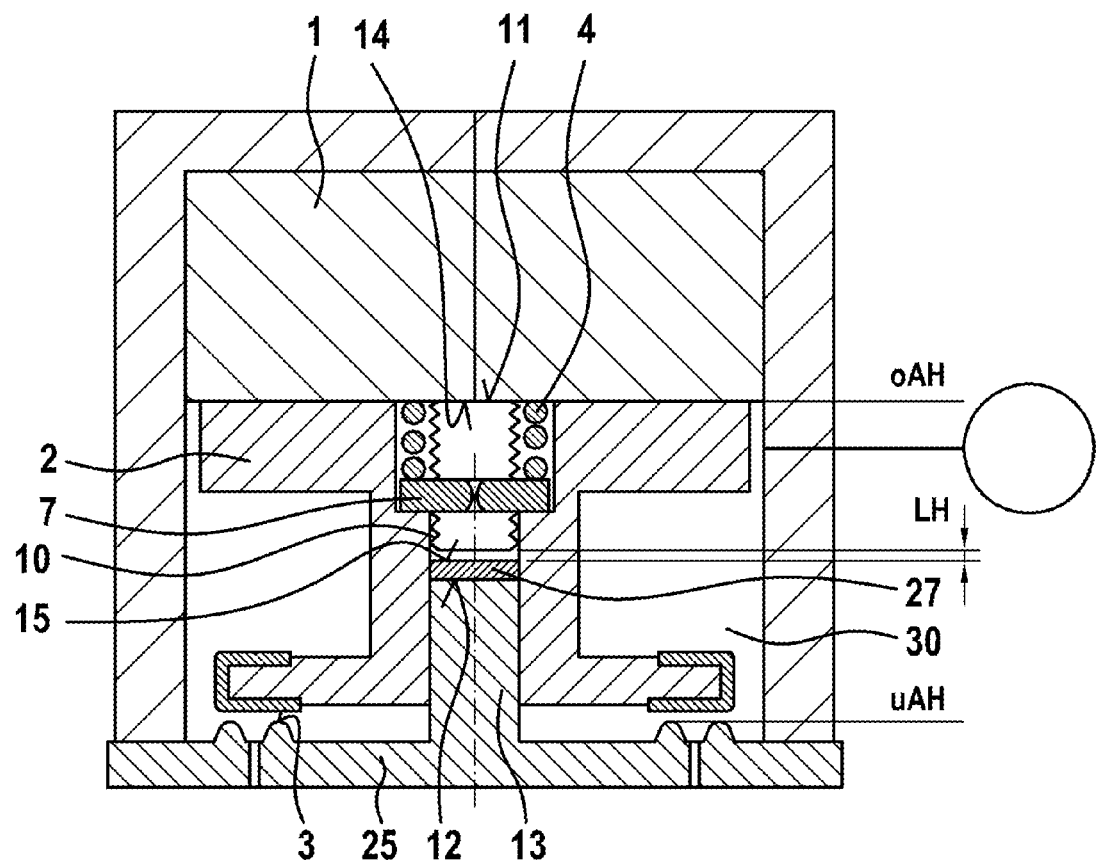
FIG. 4 shows a schematic longitudinal section through a gas valve according to the invention according to a second preferred embodiment.

A further preferred embodiment of the invention is illustrated in FIG. 4. Here, the spring rate FB of at least the lower bellows is configured such that, in the open position of the gas valve, the body 10 does not abut the setting disk 27. Instead, the body 10 has a stop surface 12 which interacts, so as to form a stroke stop 15, with the setting disk 27. The axial gap between the setting disk 27 and the body 10 defines an idle stroke LH which is to be passed through until the onset of the damping effect of the damping device 5 and the braking of the movement of the armature 2. The idle stroke LH is in this case to be selected to be smaller than the armature stroke AH, in order that the onset of the damping effect takes place before the armature 2 has reached its lower stroke stop uAH.

Correspondingly, it is possible for an axial gap to be formed between the body 9 and the electromagnet 1 in the closed position of the armature 2, with the result that an idle stroke LH is also passed through during the opening of the gas valve. In this case, the body 9 forms a stop surface 11 which interacts, so as to form a stroke stop 14, with the electromagnet 1.

In order to reliably prevent a relative movement of the throttle plate 7 relative to the armature 2, said plate can be secured fixedly to the armature 2.

Figure 5:
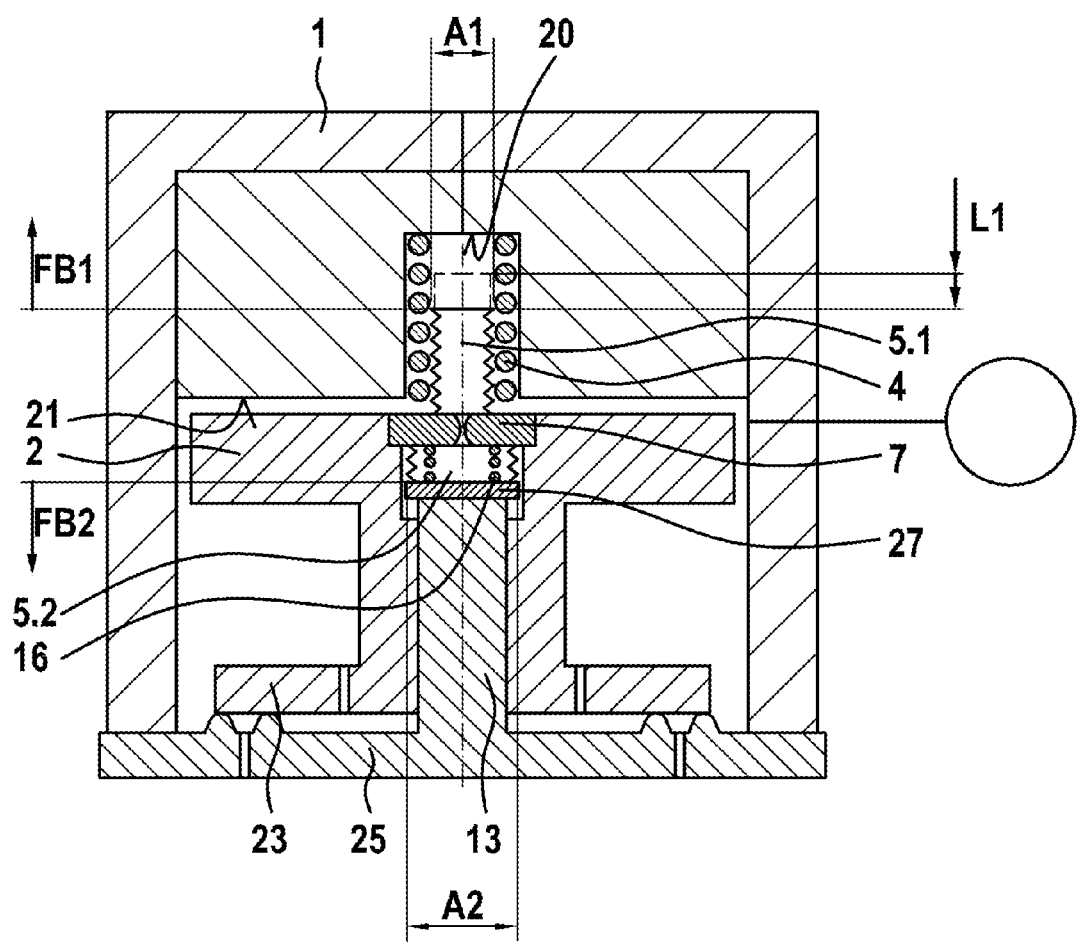
FIG. 5 shows a schematic longitudinal section through a gas valve according to the invention according to a third preferred embodiment.

A further embodiment of the gas valve according to the invention can be seen in FIG. 5. This embodiment differs from the above-described embodiments in that the damping device 5 is partially accommodated in a recess 20 of the electromagnet 1, which recess is arranged centrally in relation to an end face 21 of the electromagnet 1. Furthermore, it holds that $A_1 < A_2$ and $FB_1 < FB_2$.

The increase in the cross-sectional area $A_2$ causes the damping effect to be intensified. By contrast, the cross-sectional area $A_1$ influences only the length of the length extension of the upper bellows and not the degree of the damping.

The increase in the spring rate $FB_2$ of the lower bellows is intended to ensure that permanent contact with the setting disk 27 is ensured. Alternatively or additionally, it is possible for a damping spring 16 to be provided, which is ideally arranged in the damping volume 5.2.

Figure 6:
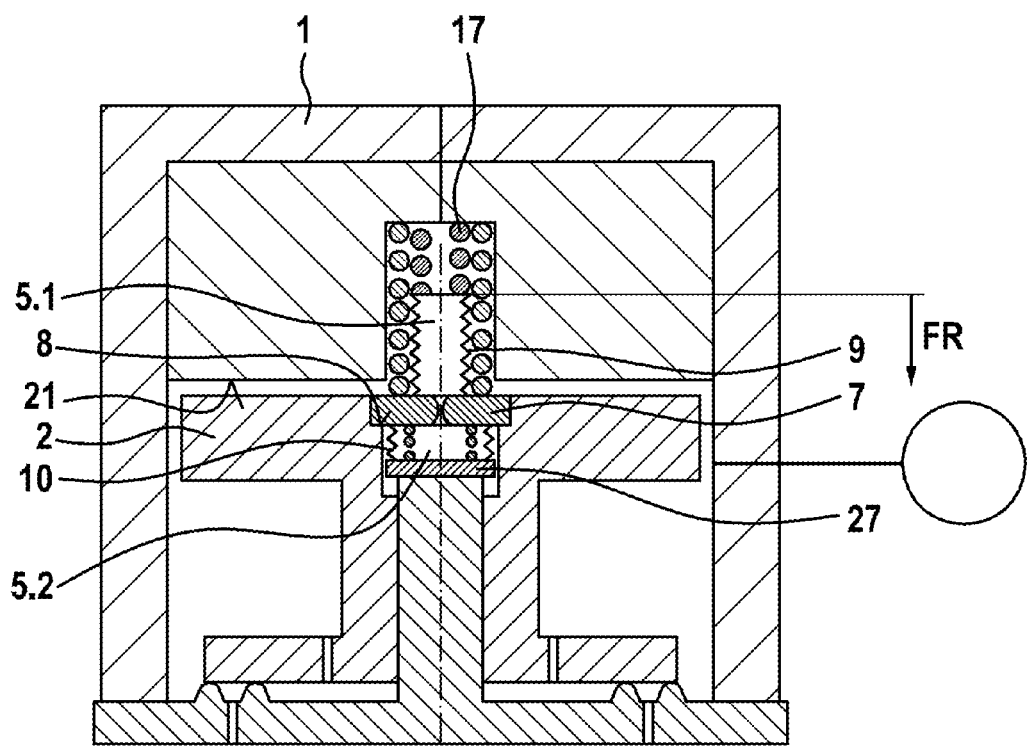
FIG. 6 shows a schematic longitudinal section through a gas valve according to the invention according to a fourth preferred embodiment.

FIG. 6 shows a further possible embodiment. This differs from the embodiment shown in FIG. 5 in particular in that the return of the lower bellows is brought about via the hydraulically acting force FR. A damping spring 17 which is supported on the upper bellows is additionally provided. On account of the support of the throttle plate 7 on the shoulder 8 of the armature 2, the damping spring 17 pushes through to the extent that the lower bellows is kept in contact with the setting disk 27. During an upward movement of the armature 2, fluid is pumped from the upper damping volume 5.1 into the lower damping volume 5.2, and the movement of the armature 2 is thus braked.

The invention claimed is:

1. A gas valve for dosing a gaseous fuel into an intake tract of an internal combustion engine, the gas valve comprising an electromagnet (1) acting on a reciprocating armature (2) which is loaded in a direction of at least one valve seat (3) by a spring force of a spring (4), and a damping device (5) for reducing a speed of the armature (2) at least over a partial range of a stroke of the armature, wherein the armature includes a shoulder (8), wherein the damping device comprises first and second fluid filled, variable damping volumes (5.1, 5.2) separated in a gas-tight manner from a region (30) charged with the gas to be dosed in, wherein the first and second fluid filled, variable damping volumes (5.1, 5.2) are connected via a throttle (6) formed in a throttle plate (7), the throttle plate (7) being arranged between the first damping volume and the second damping volume (5.1, 5.2) and supported by the shoulder (8), wherein the throttle plate (7) is connected fixedly to the armature (2) or is prestressed axially against the shoulder (8) of the armature (2) by the spring force of the spring (4).

2. The gas valve as claimed in claim 1, characterized in that at least one of the damping volumes (5.1, 5.2) is delimited by an elastic and/or deformable body (9, 10).

3. The gas valve as claimed in claim 2, characterized in that at least one body (9, 10) has an end-side stop surface (11, 12) which interacts, so as to form a stroke stop (14, 15) for the body (9, 10), with the electromagnet (1) and/or with a guide pin (13) for guiding the armature (2).

4. The gas valve as claimed in claim 2, characterized in that at least one body (9, 10) is loaded by the spring force of a damping spring (16, 17) which is arranged inside or outside the body (9, 10).

5. The gas valve as claimed in claim 1, characterized in that the damping device (5) is accommodated at least partially in a recess (18) of the armature (2).

6. The gas valve as claimed in claim 1, characterized in that the damping device (5) is accommodated at least partially in a recess (20) of the electromagnet (1).

7. The gas valve as claimed in claim 1, characterized in that the armature (2) has at least one plate-like section (22, 23) for forming an armature plate and/or for forming or for holding a valve closure element (24), wherein a sealing body composed of an elastic material forms the valve closure element (24).

8. The gas valve as claimed in claim 1, characterized in that the at least one valve seat (3) is of annular form and is delimited by two concentrically arranged, annular sealing contours.

9. The gas valve as claimed in claim 1, characterized in that at least one of the damping volumes (5.1, 5.2) is delimited by an elastic and/or deformable body (9, 10) which is formed as a hollow cylindrical bellows and/or is closed at one end side.

10. The gas valve as claimed in claim 1, characterized in that the damping device (5) is accommodated at least partially in a recess (18) of the armature (2), wherein the recess (18) is formed centrally in an end face (19), facing the electromagnet (1), of the armature (2).

11. The gas valve as claimed in claim 1, characterized in that the damping device (5) is accommodated at least partially in a recess (20) of the electromagnet (1), wherein the recess (20) is formed centrally in an end face (21), facing the armature (2), of the electromagnet (1).

12. The gas valve as claimed in claim 5, characterized in that the at least one valve seat (3) is of annular form and is delimited by two concentrically arranged, annular sealing contours which are formed by a plate-like valve seat element.

\* \* \* \* \*